(12) United States Patent
Kim (10) Patent No.: US 7,369,175 B2
(45) Date of Patent: May 6, 2008

(54) ANGLE CONTROL DEVICE FOR CAMERA IN A MOBILE COMMUNICATION TERMINAL

(75) Inventor: Dong Hee Kim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 775 days.

(21) Appl. No.: 10/664,487

(22) Filed: Sep. 17, 2003

(65) Prior Publication Data

US 2004/0056977 A1  Mar. 25, 2004

(30) Foreign Application Priority Data

Sep. 19, 2002  (KR) ............. 10-2002-0057380

(51) Int. Cl.
H04N 5/225 (2006.01)
H04N 7/00 (2006.01)
H04M 1/00 (2006.01)

(52) U.S. Cl. ............. 348/373; 348/552; 455/556.1

(58) Field of Classification Search ............. 348/14.02, 348/211.14, 373, 376, 552; 16/54; 24/487; 49/167; 379/433.13; 455/556.1, 556.2, 455/556.7

See application file for complete search history.

(56) References Cited

U.S. PATENT DOCUMENTS

| 5,815,759 A | * | 9/1998 | Tseng et al. ............. 396/541 |
| 5,993,101 A | * | 11/1999 | Kohno et al. ............. 403/305 |
| 6,069,648 A | * | 5/2000 | Suso et al. ............. 348/14.02 |
| 2001/0050711 A1 | * | 12/2001 | Karube et al. ............. 348/220 |

FOREIGN PATENT DOCUMENTS

EP  1170517 A1 *  1/2002

* cited by examiner

*Primary Examiner*—Ngoc-Yen Vu
*Assistant Examiner*—Albert H Cutler
(74) *Attorney, Agent, or Firm*—Lee, Hong, Degerman, Kang & Schmadeka

(57) ABSTRACT

Disclosed is a mobile communication terminal with an integrated camera having multidirectional adjusting capabilities to allow changes in orientation and position of the camera without altering the position and orientation of the terminal. The terminal comprises of a body, a display, and one or more input devices to enter terminal and photographic commands. A camera is affixed to the terminal, and a device for manipulating the position and orientation of the camera is included. One or more shafts operationally connect the camera to an adjusting plate so that forces applied to the adjusting plate correspond to movement and changes in orientation of the camera. Alternatively, a rotation member can be installed so that rotation of the adjustment plate results in the rotation of the camera.

19 Claims, 10 Drawing Sheets

ANGLE CONTROL DEVICE FOR CAMERA IN A MOBILE COMMUNICATION TERMINAL

CROSS REFERENCE TO RELATED APPLICATIONS

Pursuant to 35 U.S.C. § 119(a), this application claims the benefit of earlier filing date and right of priority to the Korean Patent Application No. 2002-57380, filed on Sep. 19, 2002, the content of which is hereby incorporated by reference in its entirety.

BACKGROUND OF THE INVENTION

1. Field of the Invention

The present invention relates to a mobile communication terminal with an integrated camera, and more particularly, to a mobile communication terminal with an integrated camera having multidirectional adjusting capabilities.

2. Description of Related Art

In general, mobile communication terminals include cellular phones or Personal Communication Systems (PCS) having wireless communication capabilities. As the need for video/image communication emerges along with voice communication, several types of mobile communication terminals with an integrated photographic apparatus have been suggested to satisfy this demand.

Figure 1:
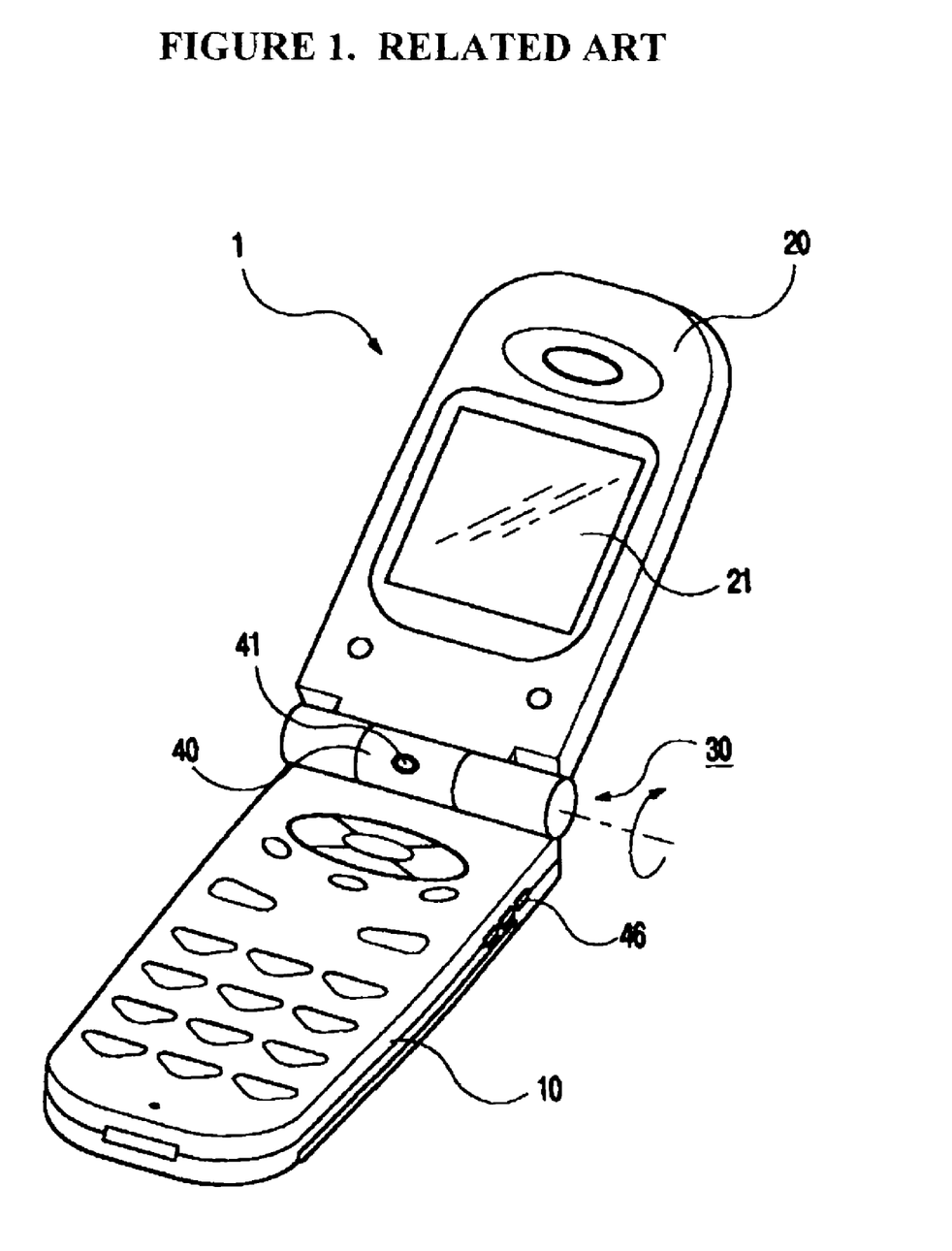
FIG. 1 illustrates a perspective view of a mobile communication terminal having an integrated camera mounted at a central portion of a hinge connection element, according to the related art.
Figure 2:
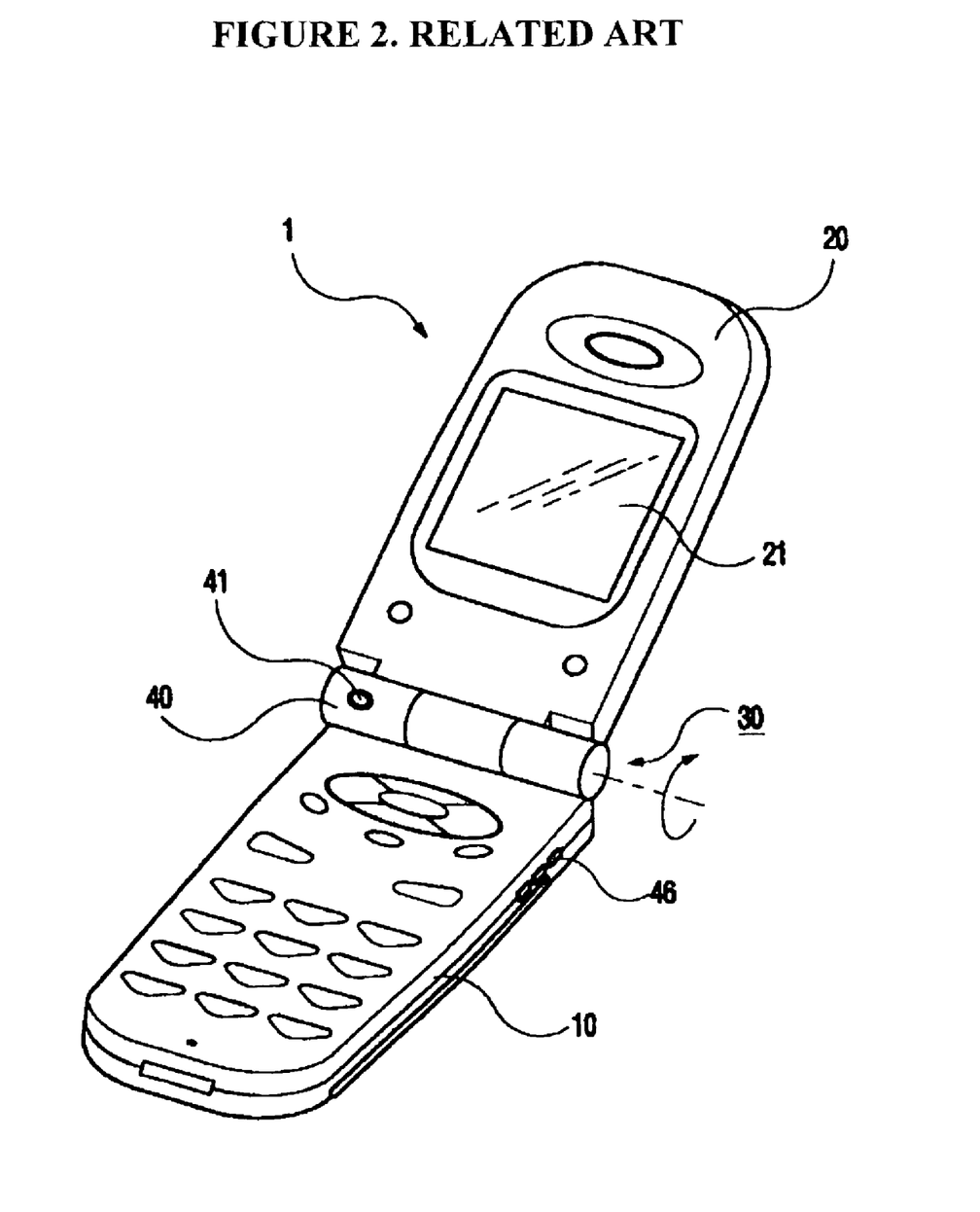
FIG. 2 illustrates a perspective view of a mobile communication terminal having an integrated camera mounted at one end of a hinge connection element, according to the related art.

Referring to FIGS. 1 and 2, a conventional mobile terminal is shown with a camera mounted on the terminal. The mobile terminal comprises a main folder 10, a subfolder 20, a hinge connection element 30 for pivotally connecting the folders 10 and 20, which are to be opened at a predetermined angle, and a digital camera 40 mounted on the hinge connection element. The digital camera 40 is fixedly mounted on a right or left hinge portion of the main folder 10 or a hinge portion of the subfolder 20. A lens 41 of the digital camera 40 is directed towards a subject to be photographed. An image of the subject is reproduced on a liquid crystal display (LCD) panel 21.

Figure 3:
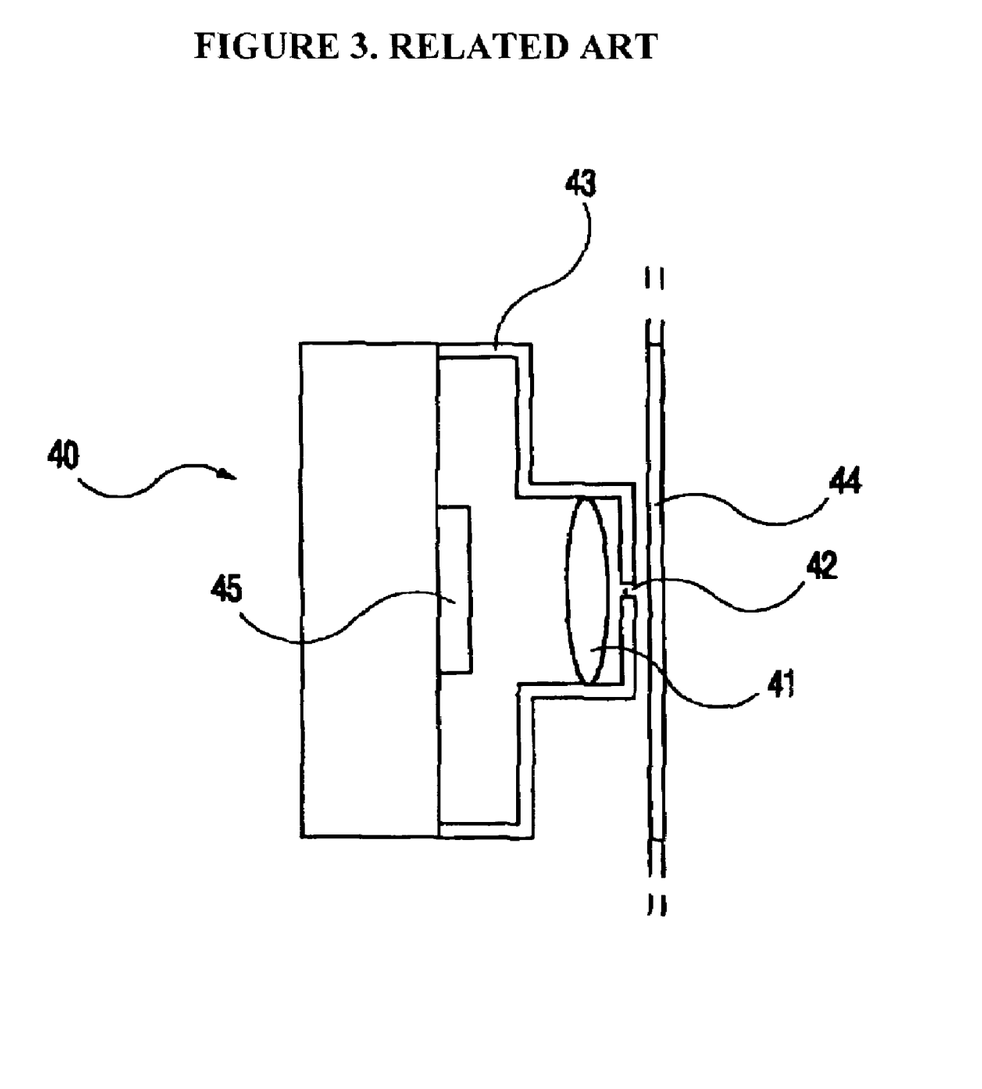
FIG. 3 illustrates a cross sectional view of a camera mounted on a mobile communication terminal according to the related art.
Figure 4:
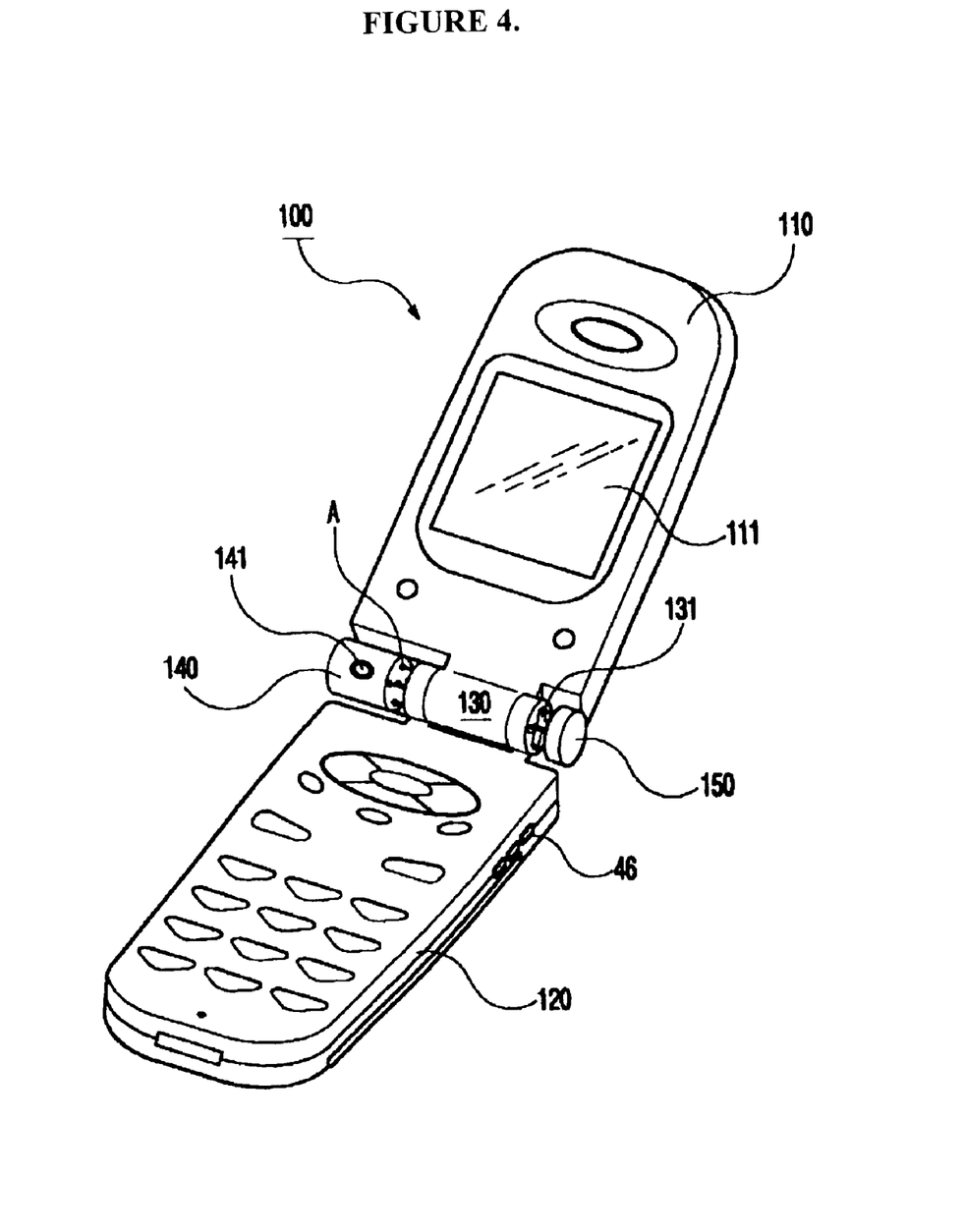
FIG. 4 illustrates a perspective view of a mobile communication terminal having an integrated camera according to one embodiment of the present invention.

Referring to FIG. 3, the lens 41 is enclosed within the digital camera 40 by a lens holder in which a light aperture 42 is formed. A transparent filter 44 is disposed in front of the lens 41, thereby protecting the lens without preventing light from passing through the lens. An image sensor 45 is disposed behind the lens 41 to convert incident optical signals from the lens 41 to electrical signals. In addition, other electronic parts are disposed within the digital camera 40. Furthermore, a shutter button 46 is provided at one side of the main folder in the mobile phone 1, as shown in FIGS. 1 and 2, to operate the camera 40.

When photographing subjects with a conventional mobile terminal 1 having a camera mounted on the terminal, the mode of the mobile phone is converted into a digital camera mode by means of a mode conversion (not shown). Next, the user directs the lens 41 to the subject and sets the imaging angle and focus upon viewing the image displayed on the LCD panel 21. Afterwards, the user photographs the image by pushing the shutter button 46 and stores the image as image data to a memory device in the mobile phone 1. The user may then perform various desired operations such as reproducing, editing, transmitting and deleting operations on the image data.

However, in this conventional mobile terminal 1 having a camera mounted on the terminal, it may be inconvenient for a user to correctly set the imaging angle in some photographing environments. The lens 41 of the digital camera and the screen of the liquid crystal display panel are fixedly directed to the subject and, in some cases, the user himself when the mobile phone 1 is opened. Thus, when a user photographs a particular object, the user must tilt the lens 41 and the display panel in the direction of the object being photographed. Consequently, the position and angle of the screen 21 of the LCD panel relative to the user is altered along with the position and angle of the lens 41. This makes it inconvenient and difficult for the user to correctly see the image displayed on the LCD panel 21.

Accordingly, a solution is needed to allow or facilitate a user's viewing the display while photographing an object when using a mobile communication terminal with an integrated camera.

SUMMARY OF THE INVENTION

Accordingly, the present invention is directed to a mobile communication terminal with an integrated camera that substantially obviates one or more problems due to limitations and disadvantages of the related art above.

An object of the present invention is to provide a mobile communication terminal with an integrated camera having multidirectional adjusting capabilities.

Another object of the present invention is to provide a mobile communication terminal with an integrated camera that can be rotated with respect to a hinge axis.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, there is provided a mobile communication terminal with an integrated camera that comprises a body, at least one manipulation device disposed on the body that performs an operational function of the camera, and a display for reproducing an image created by the camera, wherein the camera is mounted on the body of the mobile communication terminal so that orientation of the camera can be manipulated.

According to one aspect of the present invention, the mobile communication terminal is a folding type mobile communication terminal and further comprises a lower main folder, an upper subfolder, a hinge connection element that pivotally connects the lower main folder to the upper subfolder, an adjustment plate disposed on the first side of the hinge connection element, and the camera being disposed on the second side of the hinge connection element. Further, manipulation of the adjustment plate results in a change in orientation of the camera by providing a lateral force onto an area of the adjustment plate opposite to a desired pivot direction of the camera. This manipulation can be effected by having at least one shaft axially disposed in the hinge connection element and having a first and second ends connected to the adjustment plate and the camera, respectively.

According to another aspect of the present invention, the mobile communication terminal further comprises a lower main folder, an upper subfolder, a hinge connection element that pivotally connects the lower main folder to the upper subfolder, a cylindrical pivot member axially disposed within the hinge connection element, an adjustment plate disposed on the first side of the hinge connection element, and the camera being disposed on the second side of the hinge connection element. Rotation of the adjustment plate results in a change in direction of the camera. Further, manipulation of the adjustment plate results in a change in orientation of the camera by providing a lateral force onto an area of the adjustment plate opposite to a desired pivot direction of the camera. This manipulation can be effected by having at least one shaft axially disposed in the hinge connection element and having a first and second ends connected to the adjustment plate and the camera, respectively.

According to this aspect of the present invention, at least one groove is formed on the inner circumferential surface of the hinge connection element and is engaged by at least one protrusion that is formed on the cylindrical pivot member. The groove encompasses less than 360 degrees of the inner circumferential surface so that the cylindrical pivot member cannot completely rotate within the hinge connection element.

It is to be understood that both the foregoing general description and the following detailed description are exemplary and explanatory and are intended to further describe the invention as claimed.

BRIEF DESCRIPTION OF THE DRAWINGS

The accompanying drawings, which are included to provide a further understanding of the invention and are incorporated in and constitute a part of this specification, illustrate embodiments of the invention and, together with the description, serve to explain the principles of the invention.

In the drawings.

Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

Reference will now be made in detail to one or more embodiments of the invention, examples of which are illustrated in the accompanying drawings.

In FIGS. 4 to 8, a mobile communication terminal 100 with an integrated camera 140, in accordance with the present invention is illustrated. Depending on implementation, the present invention may be utilized in a clamshell type mobile phone, and is disclosed as applicable to such implementation. It is noteworthy, however, that this disclosed application is provided by way of example. As such, the present invention may be applied to and embodied in any other type of mobile communication terminal including, for example, personal data assistants (PDA's), notebook computers, handheld computers, and other portable devices.

The camera 140 is disposed between an upper end of the lower main folder 120 and a lower end of the upper subfolder 110. Similarly, the adjustment plate 150 is disposed on the opposite side of the terminal where the camera 140 is disposed, between an upper end of the lower main folder 110 and a lower end of the upper subfolder 120.

Figure 5:
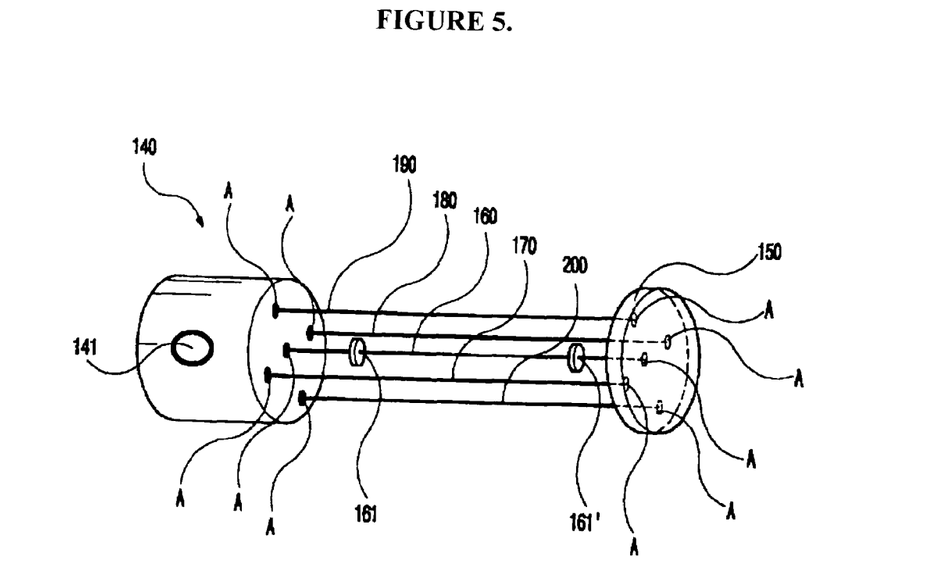
FIG. 5 illustrates an exploded perspective view of a connection between an integrated camera and an adjustment plate according to one embodiment of the present invention.

Referring to FIG. 5, a central shaft 160, a right shaft 180, a left shaft 170, an upper shaft 190, and a lower shaft 200 are provided and pass though the hinge connection element 130 of the lower main folder 120. An upper subfolder 110 and the ends of each of said shafts protrude a predetermined length from the right and left side surfaces of the hinge connection element 130. The central shaft 160 is provided with a pair of circular stoppers 161 and 161' that are situated a predetermined distance from the camera 140 and the adjustment plate 150, respectively. The circular stoppers 161 and 161' are affixed to the outer side surfaces of the hinge connection element 130 in order to prevent the central shaft 160 from sliding in an axial direction beyond a first limit. The adjustment plate 150 comprises a hard plastic material or a flexible rubber material and is circular in shape, for example.

Figure 6:
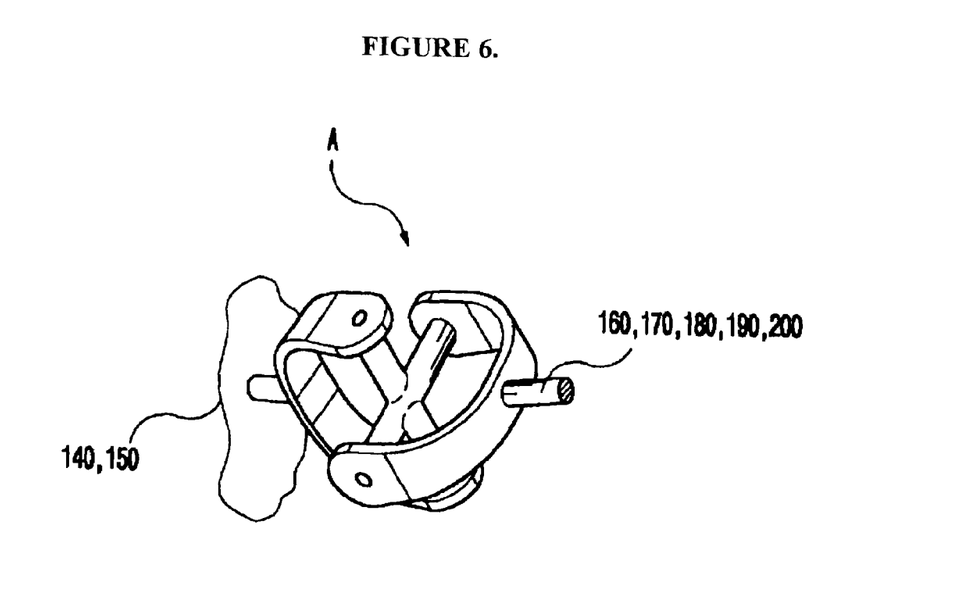
FIG. 6 illustrates a perspective view of a structure for connecting central, right, left, upper, and lower shafts to the camera and to the adjustment plate according to one embodiment of the present invention.

The right shaft 180, the left shaft 170, the upper shaft 190, and the lower shaft 200 are formed symmetrically with respect to the central shaft 160 as a rotational axis. A first end of each of the central, left, right, upper, and lower shafts 160, 170, 180, 190 and 200, respectively, is connected to the camera 140 through a universal joint mechanism A. A second end of each of the central, left, right, upper, and lower shafts 160, 170, 180, 190 and 200 is also connected to a camera adjustment plate 150 through a universal joint mechanism A.

The universal joint element A is a connecting mechanism by which the camera 140 and the adjustment plate 150 are connected to each shaft 160, 170, 180, 190 and 200 in order to pivotally rotate the camera 140 and adjustment plate 150 in the upward, downward, right and left directions. The universal joint element is a universal joint element known to one of ordinary skill in the art.

Figure 7:
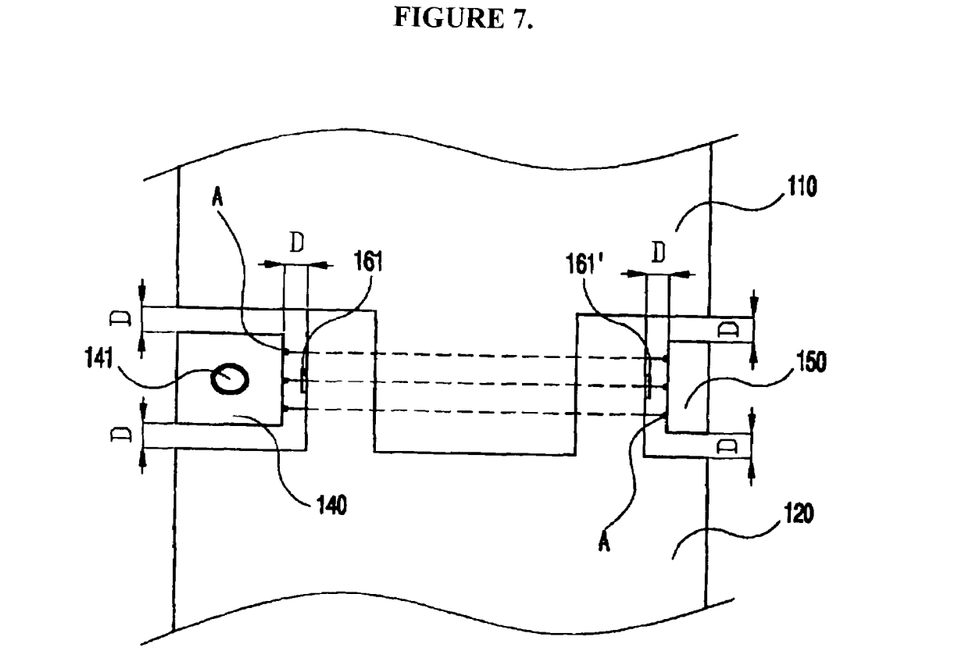
FIG. 7 illustrates a partial frontal elevation view of a hinge connection element of a mobile communication terminal according to one embodiment of the present invention.
Figure 8:
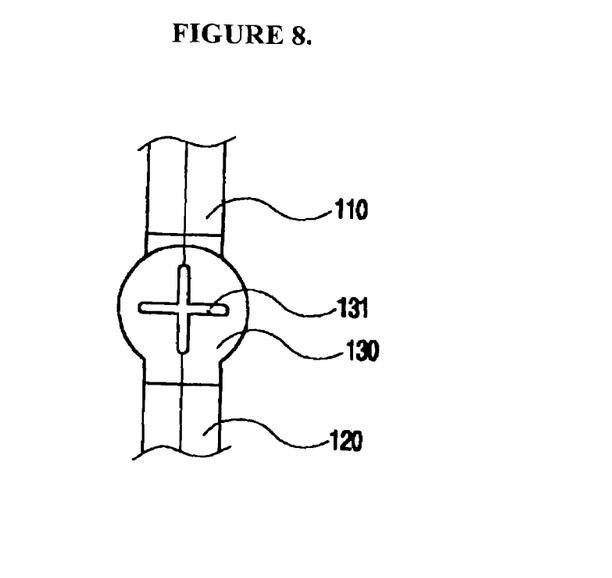
FIG. 8 illustrates a partial side elevation view of a hinge connection element of a mobile communication terminal according to one embodiment of the present invention.

There is a predetermined distance D between the camera 140 and the left side end of the hinge connection element 130, the upper end of the lower main folder 110, and the lower end of the upper subfolder 120. There is also a predetermined distance D between the adjustment plate 150 and the right side end of the hinge connection element 130, the upper end of the lower main folder 110, or the lower end of the upper subfolder 120.

The central, left, right, upper, and lower shafts 160, 170, 180, 190 and 200, respectively, axially pass through shaft openings 131 that are formed at right and left side ends of the hinge connection element 130. Each of the shaft openings has a cruciform and the shafts 160, 170, 180, 190 and 200 are positioned at the central, left, right, upper, and lower portions, respectively, of the cruciform of the shaft openings.

Figure 9:
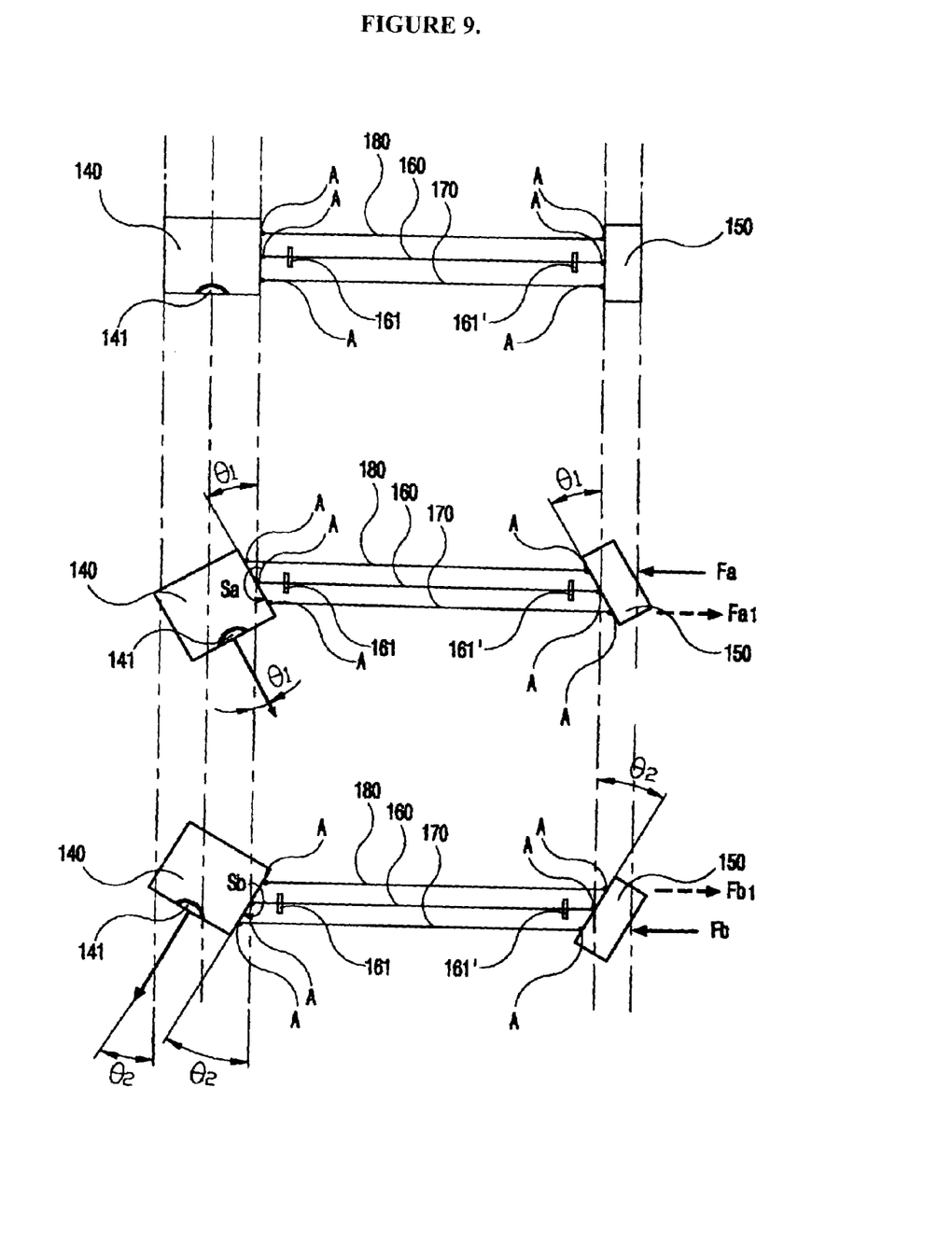
FIG. 9 illustrates a schematic view of the relationship between operations of the right and left shafts and the associated rotations of the camera according to one embodiment of the present invention.
Figure 10:
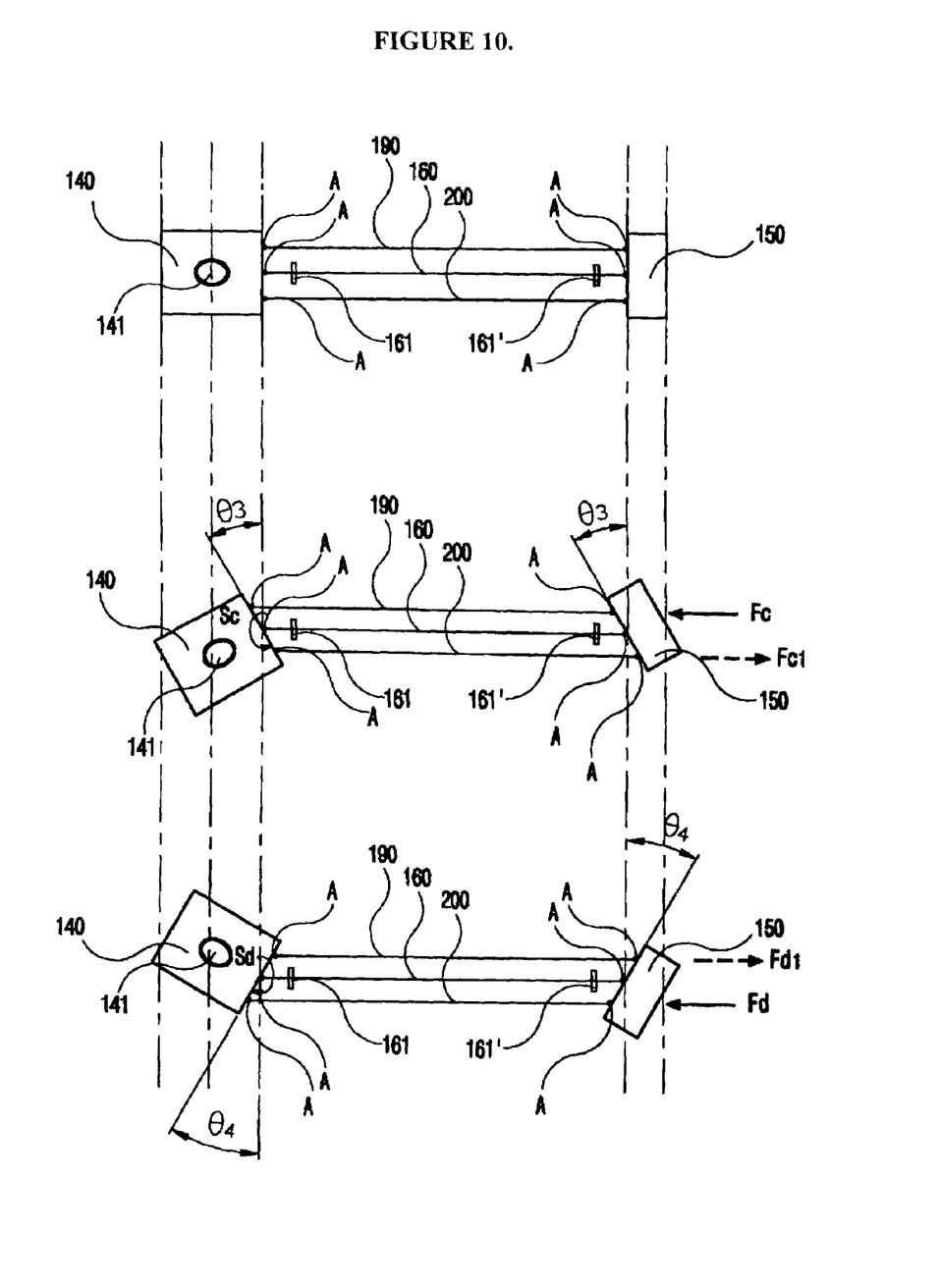
FIG. 10 illustrates a schematic view of the relationship between operations of the upper and lower shafts and the associated rotations of the camera according to one embodiment of the present invention.

Referring to FIGS. 9 to 10, operation of an embodiment of the present invention will be described.

In order to rotate the camera 140 in a laterally inwards direction, an external force Fa is initially applied to the adjustment plate 150. As a result of the external force Fa, the right shaft 180, which is connected to the adjustment plate 150, slides through the shaft opening 131, thereby correspondingly moving the camera 140. The camera 140 and the adjustment plate 150 are pivotally rotated in the direction Sa at the universal joint portions A, which are positioned at both ends of the central shaft 160 and act as the rotational axes. Consequently, the lens 141 mounted on the camera 140 is pivotally rotated the direction Sa, as well. Furthermore, the left shaft 170 slides through the shaft opening 131 in the direction Fa1. The rotational angle of the lens 141 is approximately equivalent to the rotational angle θ1 of the camera 140, which is proportional to the sliding distances of the right and left shafts 180 and 170.

In order to rotate the camera 140 in a laterally outwards direction, an external force Fb is initially applied to the adjustment plate 150. As a result of the external force Fb, the left shaft 170, which is connected to the adjustment plate 150, slides through the shaft opening 131, thereby correspondingly moving the camera 140. The camera 140 and the adjustment plate 150 are pivotally rotated in the direction Sb at the universal joint portions A, which are positioned at both ends of the central shaft 160 and act as the rotational axes. Consequently, the lens 141 mounted on the camera 140 is pivotally rotated the direction Sb, as well. Furthermore, the right shaft 180 slides through the shaft opening 131 in the direction Fb1. The rotational angle of the lens 141 is equivalent to the rotational angle θ2 of the camera 140, which is proportional to the sliding distances of the right and left shafts 180 and 170.

In order to rotate the camera 140 in a vertically downwards direction, an external force Fc is initially applied to the adjustment plate 150. As a result of the external force Fb, the upper shaft 190, which is connected to the adjustment plate 150, slides through the shaft opening 131, thereby correspondingly moving the camera 140. The camera 140 and the adjustment plate 150 are pivotally rotated in the direction Sc at the universal joint portions A, which are positioned at both ends of the central shaft 160 and act as the rotational axes. Consequently, the lens 141 mounted on the camera 140 is pivotally rotated the direction Sc, as well. Furthermore, the lower shaft 200 slides through the shaft opening 131 in the direction Fc1. The rotational angle of the lens 141 is equivalent to the rotational angle θ3 of the camera 140, which is proportional to the sliding distances of the upper and lower shafts 190 and 200.

In order to rotate the camera 140 in a vertically upwards direction, an external force Fd is initially applied to the adjustment plate 150. As a result of the external force Fd, the lower shaft 200, which is connected to the adjustment plate 150, slides through the shaft opening 131, thereby correspondingly moving the camera 140. The camera 140 and the adjustment plate 150 are pivotally rotated in the left direction Sd at the universal joint portions A, which are positioned at both ends of the central shaft 160 and act as the rotational axes. Consequently, the lens 141 mounted on the camera 140 is pivotally rotated the direction Sd, as well. Furthermore, the upper shaft 190 slides through the shaft opening 131 in the direction Fd1. The rotational angle of the lens 141 is equivalent to the rotational angle θ4 of the camera 140, which is proportional to the sliding distances of the upper and lower shafts 190 and 200.

Accordingly, the maximal rotational angle of the camera 140 is determined with respect to the maximal axial distance traveled by the right, left, upper and lower shafts 170, 180, 190, and 200, respectively. The axial distance corresponds to the spacing distance D, as described in FIG. 7, between the camera 140 and the left side end of the hinge connection element 130, the upper end of the lower main folder 110, or the lower end of the upper subfolder 120.

Figure 11:
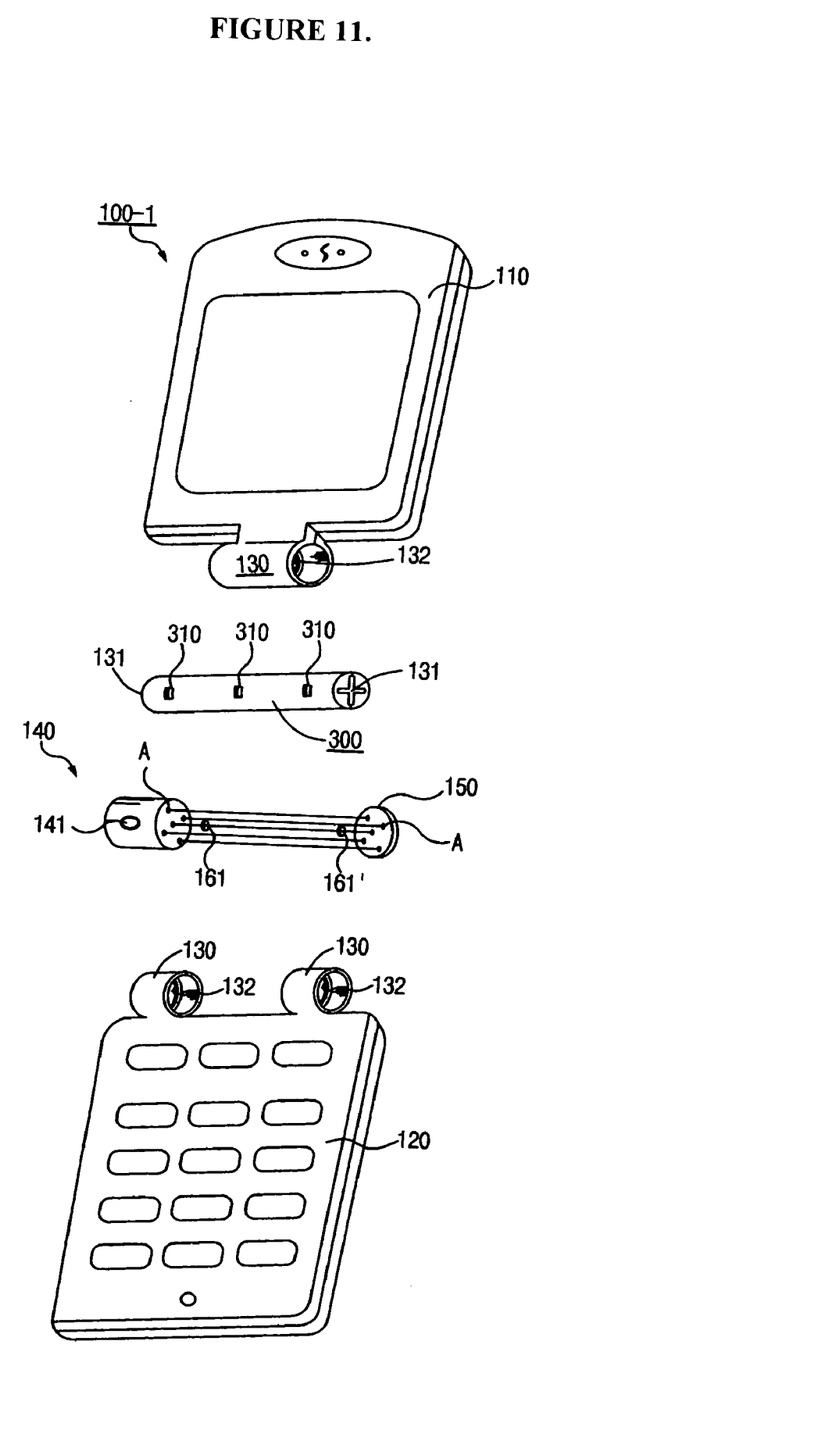
FIG. 11 illustrates an exploded perspective view of a mobile communication terminal according to an alternative embodiment of the present invention.
Figure 12:
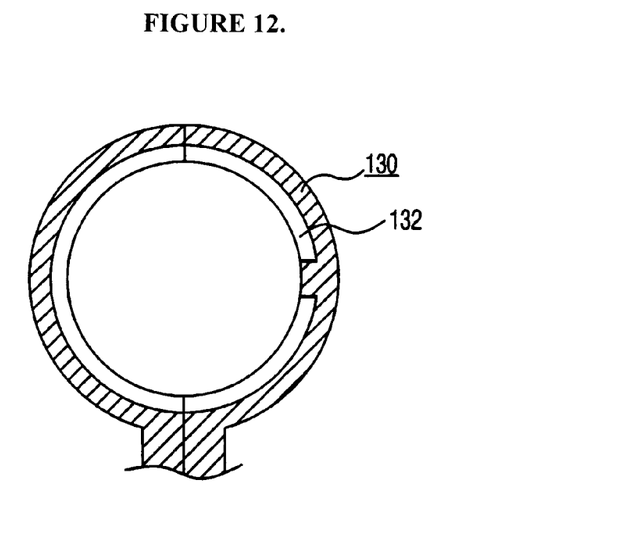
FIG. 12 illustrates a side cross sectional view of the hinge connection element according to an alternative embodiment of the present invention.
Figure 13:
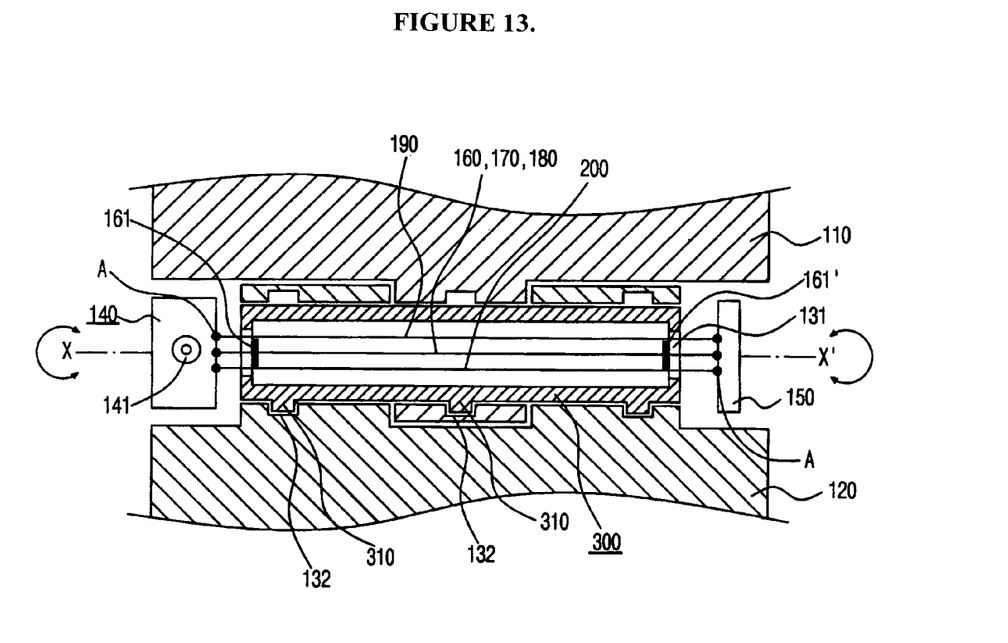
FIG. 13 illustrates a front cross sectional view of the hinge connection element according to an alternative embodiment of the present invention.

FIGS. 11-13 refer to an alternative embodiment of the present invention, wherein a mobile communication terminal 100-1 is shown having a camera 140 disposed between an upper end of a lower main folder 120 and a lower end of an upper subfolder 110. A hinge connection element 130 is shown as having two cylindrically shaped members laterally disposed on the upper end of the lower main folder 120 and one cylindrically shaped member laterally disposed on the lower end of the upper subfolder 110, which is to be inserted between the two member set on the upper end of the lower main folder 120. At least one vertical groove 132 is formed on the inner surface of the hinge connection element.

A cylindrical pivot member 300 is inserted into the hinge connection element 130. At least one protrusion 310 is formed at a predetermined position on an outer circumferential surface of the cylindrical pivot tube 300. The at least one protrusion 310 engages the at least one groove 132 located on the inner surface of the hinge connection element 130, thereby preventing axial movement of the cylindrical pivot member 300 but allowing rotational movement. The groove 132, when formed on the inner surface of the hinge connection element 130, encompasses preferably less than 360° in order to prevent the cylindrical pivot member 300 from completely and freely rotating.

An adjustment plate 150 and a camera 140 are disposed on laterally opposing sides of the terminal 100-1 at the hinge connection element 130. Central, left, right, upper and lower shafts 160, 170, 180, 190 and 200, respectively, are connected to the inner side surfaces of the adjustment plate 150 via universal joint mechanisms A. The shafts 160, 170, 180, 190, and 200 pass through the shaft opening 131 of the cylindrical pivot member 300. As a result of the cylindrical pivot member 300, rotation of the adjustment plate 150 results in the rotation of the camera 140. Similar to the previous embodiment, the camera 140 can also be adjusted in the upwards, downwards, leftwards, or rightwards directions by applying lateral force to the corresponding area on the adjustment plate 150.

It will be apparent to those skilled in the art that various modifications and variations can be made in the present invention without departing from the spirit or scope of the invention. Therefore, the foregoing description of these embodiments of the present invention has been presented for the purposes of illustration and description. It is not intended to be exhaustive or to limit the invention to the precise form disclosed. Thus, it is intended that the present invention cover the modifications and variations of this invention provided they come within the scope of the appended claims and their equivalents. Preferred embodiments were shown in the context of folding type mobile communication terminals. In alternative embodiments, candy bar and PDA type terminals can be substituted for the present invention.

What is claimed is:

1. A folding type mobile communication terminal with an integrated camera, the terminal comprising:
   a body having a lower main folder and an upper subfolder;
   a hinge connection element configured to pivotally connect the lower main folder to the upper subfolder, wherein the camera is located on a first side of the hinge connection element laterally opposite to an adjustment plate located on a second side of the hinge connection element; and
   a display configured to reproduce an image created by the camera, wherein the camera is mounted on the body of the mobile communication terminal so that orientation of the camera can be manipulated,
   wherein the camera and the adjustment plate are operably connected by a central shaft, a right shaft, a left shaft, an upper shaft, and a lower shaft, each shaft being axially disposed within the hinge connection element providing the camera with a first, second, and third degree of movement.

2. The terminal of claim 1, wherein the camera is operably connected to the adjustment plate to traverse an angle perpendicular to and in the same plane as a longitudinal axis of the hinge connection element thereby defining the first degree of movement.

3. The terminal of claim 2, wherein the adjustment plate comprises a rigid polymer.

4. The terminal of claim 2, wherein the adjustment plate comprises a flexible rubber.

5. The terminal of claim 1, wherein the camera is operably connected to the adjustment late to rotate around a pivot axis that is parallel to a camera lens axis, and wherein the pivot axis is perpendicular to and in the same plane as the longitudinal axis of the hinge connection element thereby definingihe second degree of movement.

6. The terminal of claim 1, wherein the camera is operably connected to the adjustment plate to rotate around the longitudinal axis of the hinge connection element thereby defining the third degree of movement.

7. The terminal of claim 1, further comprising:
   first and second shaft openings formed on the first and second sides of the hinge connection element, respectively, wherein the central, right, left, upper and lower shafts travel through the first and second openings and are connected to the adjustment plate and camera, respectively.

8. The terminal of claim 7, wherein the first and second openings are cruciform in shape.

9. The terminal of claim 7, wherein a first and second stoppers are disposed on the first and second ends of the central shaft, respectively, adjacent to the first and second ends of the hinge connection element.

10. A method of operating a folding type mobile communication terminal with a camera mounted on a hinge connection element joining a lower main folder and an upper subfolder of the terminal, the method comprising;
    manipulating the camera in at least one of three degrees of movement, wherein the first degree of movement is traversing an angle perpendicular to and in the same plane as a longitudinal axis of the hinge connection element, wherein the second degree of movement is rotating the camera around a pivot axis that is parallel to a camera lens axis and perpendicular to and in the same plane as the longitudinal axis, and wherein the third decree of movement is rotating the camera around the longitudinal axis; and
    manipulating at least one control element of the terminal to capture an image from the camera,
    wherein the camera located on a first side of the hinge connection element laterally opposite to an adjustment plate located on a second side of the hinge connection element, and
    wherein the camera and the adjustment plate are operably connected by a central shaft, a right shaft, a left shaft, an upper shaft, and a lower shaft, each shaft being axially disposed within the hinge connection element providing the camera with the first, second, and third degrees of movement.

11. A folding type mobile communication terminal with an integrated camera, the terminal comprising:
    a lower main folder;
    an upper subfolder;
    a tubular hinge connection element that pivotally connects the lower main folder to the upper subfolder, wherein the tubular hinge connection element comprises a first side laterally opposite to a second side, a central shaft axially disposed approximately centrally within the tubular hinge connection element, a right shaft, a left shaft, an upper shaft, and a lower shaft axially disposed in the tubular hinge connection element wherein the right, left, upper and lower shafts are approximately symmetrically disposed around the central shaft and providing the camera with a first, second, and third degree of movement;
    a cylindrical pivot member inserted into the tubular hinge connection element;
    an adjustment plate disposed on the first side of the tubular hinge connection element, wherein manipulation of the adjustment plate results in a change in orientation of the camera; and
    the camera disposed on the second side of the tubular hinge connection element.

12. The terminal of claim 11, further comprising:
    at least one partially circumferential groove formed on inner surface of the tubular hinge connection element; and
    at least one protrusion formed on the cylindrical pivot member, wherein the at least one protrusion engages the at least one partially circumferential groove so that rotation of the cylindrical pivot member is limited within the tubular hinge connection element.

13. The terminal of claim 12, further comprising at least one shaft axially disposed within the tubular hinge connection element and having first and second ends connected to the adjustment plate and the camera, respectively.

14. The terminal of claim 13, wherein at least one of the first and second ends of the shaft is connected to the adjustment plate and the camera, respectively, via a universal joint element.

15. The terminal of claim 14, further comprising:
    first and second shaft openings formed on the first and second sides of the tubular hinge connection element, respectively, wherein the central, right, left, upper and lower shafts travel through the first and second openings and are connected to the adjustment plate and camera, respectively.

16. The terminal of claim 15, wherein the first and second openings are cruciform in shape.

17. The terminal of claim 15 wherein first and second stoppers are disposed on the first and second ends of the central shaft, respectively, adjacent to the first and second ends of the tubular hinge connection element.

18. The terminal of claim 11, wherein the adjustment plate comprises a rigid polymer.

19. The terminal of claim 11, wherein the adjustment plate comprises a flexible rubber.

* * * * *